United States Patent Office 3,506,484
Patented Apr. 14, 1970

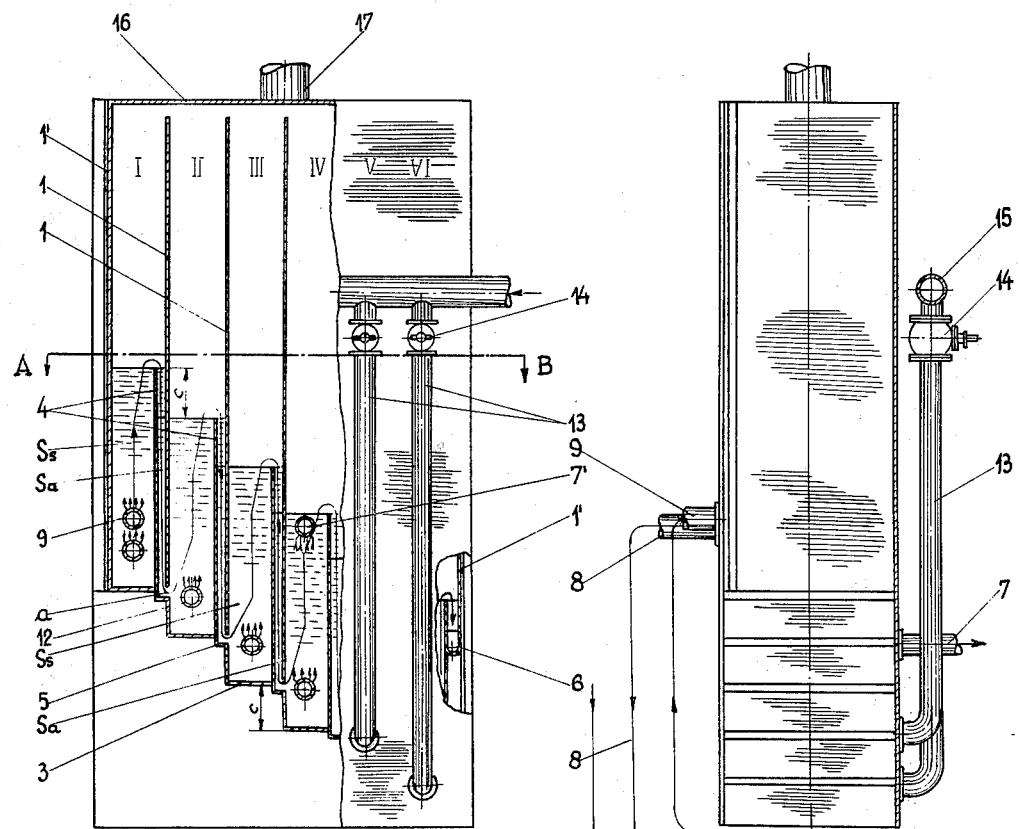
Fig.1
Fig.2
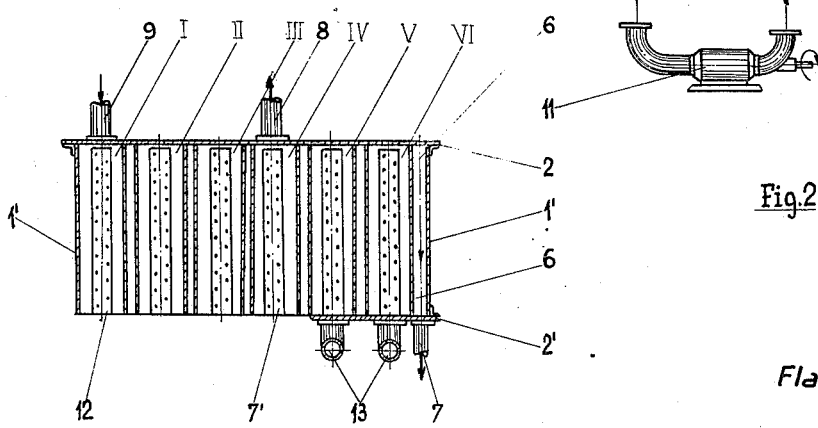
Fig.3
Flavius N. Domsa
INVENTOR.
BY
Karl F. Ross
Attorney

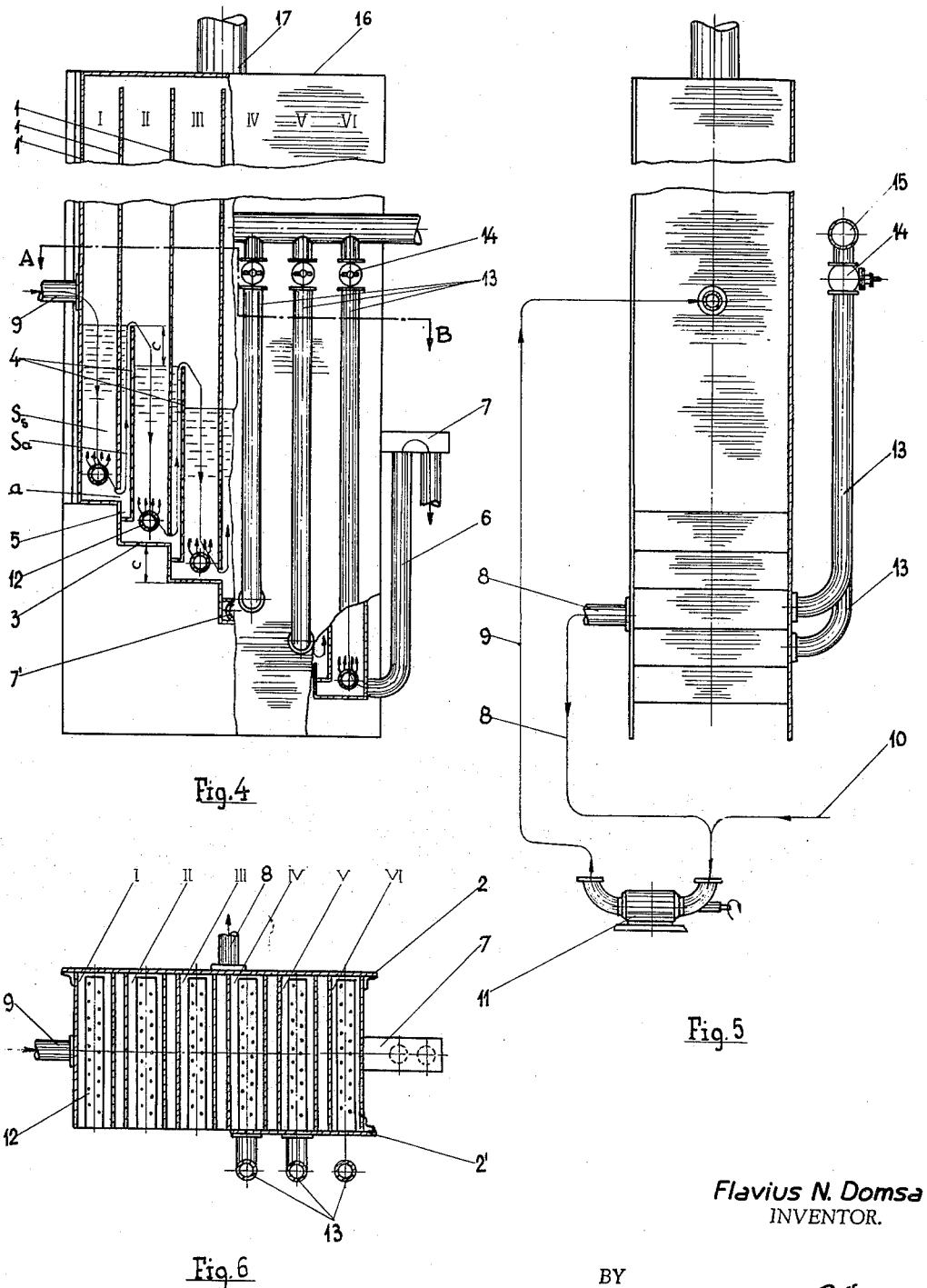

3,506,484
APPARATUS FOR THE CONTINUOUS TREATMENT OF SUGAR INDUSTRY JUICES WITH CARBON DIOXIDE
Flavius N. Domsa, 1 Str. Nuferilor, Bucharest, Rumania
Filed June 23, 1966, Ser. No. 559,765
Int. Cl. C13d 3/00
U.S. Cl. 127—12      6 Claims

ABSTRACT OF THE DISCLOSURE

Apparatus for the continuous treatment (with carbon dioxide) of sugar-industry juices for their purification. The treatment chamber is subdivided into a series of deep and relatively narrow compartments with rectangular horizontal cross section arranged in cascade, with free-fall juice flow through the compartment series. In each portion wall between adjacent compartments and over all its width, a narrow opening is provided near the bottom. Each compartment has an inner vertical wall, nearer the dividing wall of the following compartment to act as a weir and the level of the liquid in the compartment while dividing the liquid space into a main zone for saturation with carbonation gases bubbled through the liquid from a distributor located in the lower part and into an auxiliary zone, in which the juices pass in the opposite direction to the saturation zone of the next compartment.

---

The present invention relates to an apparatus for the carbon-dioxide treatment of sugar industry juices to purify them.

Essentially, the apparatus has a treatment chamber composed of a series of prismatic compartments, arranged in cascade and through which juices pass by free fall.

For the purification of raw juices in sugar refineries, it is common to provide a clarifying process (liming) wherein caustic lime in the form of lime milk to the processed beet mass. The liming is followed by carbon-dioxide treatment to saturation of the juices, in a two-stage process. The first saturation, up to 0.08–0.06% alkalinity, for precipitation of colloidal and proteic impurities by adsorption on the precipitate is followed by a second saturation, after removal of the suspension and a possible small addition of lime milk, to complete purification. The calcium carbonate suspension which absorbs the nonsugars and coloring matter is removed by decantation and filtering.

Prior-art systems making use of multistage treatment of the juices of the sugar industry have involved a plurality of vessels through which the juice is passed in succession. In one or more zones, the juice is treated with carbon dioxide. These systems have several disadvantages, including the drawback that some juice may pass untreated through the system. Moreover, some of the earlier systems required single-stage treatment and subsequent transfer of the entire bulk of the treated product to subsequent stage-vessels, thereby creating difficulties in handling or processing the materials.

The principal object of the present invention is to provide a continuously operating apparatus for the purification and the processing of sugar-industry juices capable of performing a number of operations under various conditions which cooperate for better juice purification, thereby enabling the production of more sugar of higher quality with lower operating and capital expenses.

Another object of this invention is the provision of an improved apparatus for the treatment of juices in which the juices can be processed continuously without the danger of shunting untreated portion of the juice to the output of the device.

In the apparatus according to invention, the juice-treating space or chamber is subdivided into a series of prismatic compartments totalling $n$ in number, with rectangular, deep and narrow horizontal cross section; the compartments are arranged in cascade, at decreasing levels, separated by dividing walls that have, at their bottoms, respective narrow openings over the entire width of the compartments for communication between them.

Each compartment has an afferent inside vertical wall, acting as a weir for limiting the liquid level, this wall being parallel and is located close to the partition or dividing wall of the next compartment. Thus each compartment includes a relatively wide main saturation zone and a relatively narrow auxiliary zone separated by the weir. The juices pass from one compartment to another by free fall. The juice circulation in all of the saturation zones of the compartments is generally vertically and in the same direction. The sugar-juice flow in each auxiliary zone or space between the inner wall or weir and the proximal wall of the next successive compartment in the series and through the narrow opening, in a direction opposite to the flow direction in the saturation space of the same compartment for the juice transfer to the next compartment. This direction change also forms a hydraulic seal between the compartments.

Sugar juices are supplied to the first compartment of the series. After passing through all the $n$ compartments of the series, they are discharged via a collector.

Each compartment is provided within its saturation space, toward the bottom thereof and over its full width with a carbonation-gas distributor (e.g. for bubbling carbon dioxide through the juices).

All of the gas distributors are supplied from a pipe with automatic flow control for each distributor as a function of alkalinity or of the pre-established juice pH.

The apparatus structure allows sugar-juice flow through each compartment, in parallel flow lines and along the entire apparatus in flow lines lying in planes parallel to each other. The juice particles traverse thus substantially equal distances within the apparatus along paths that do not intersect, in equal periods of time corresponding to the optimum saturation treating duration.

The fully treated juices upon discharge from the apparatus have no opportunity to be contaminated by juice from the first compartment, with a lower processing duration and incomplete treatment, since the division of the apparatus into compartments with the aforedescribed circulation, allows communication only through the hydraulic seals.

The above and other objects, features and advantages of the present invention will become more readily apparent from the following description, reference being made to the accompanying drawing in which:

FIG. 1 is a side-elevational view, partly broken away, of an apparatus for the uniflow treatment of sugar juices with carbon dioxide;

FIG. 2 is a front view of the apparatus of FIG. 1 taken in the direction of arrow A and showing diagrammatically the relationship of the pump and the feed pipes for the juices;

FIG. 3 is a cross section taken along line A–B of FIG. 1;

FIG. 4 is a view similar to FIG. 1 but showing an apparatus in which countercurrent treatment of the juices with carbon dioxide can be carried out;

FIG. 5 is a front view of the apparatus in the direction of arrow A in FIG. 4 and also diagrammatically illustrates the piping system; and FIG. 6 is a horizontal cross section of the device of FIG. 4 taken along line A–B thereof.

The processing space of the apparatus, shown in FIGS. 1–3, is composed of adjoining 6 compartments I to VI, respectively separated from each other by frontal walls 1' and dividing walls 1 connected to the common lateral walls 2, 2', with the bottoms 3 in steps. In each compartment there is an inner vertical wall 4 or weir, located near the dividing wall 1, towards the next compartment. For each compartment 4, the saturation space $S_s$ and auxiliary space $S_a$ extend to the height of the inner vertical wall 4 and contain the juices. The dividing wall 1 is provided at its lower part, with a narrow opening $a$ over the entire depth of the device, for the transfer of juices to the next compartment. At the junctions of inner vertical walls 4 to bottoms 3 are located respective feet 5, which complete the auxiliary spaces and define one side of each slot $a$.

The inner vertical walls 4 have the same height and, between the levels of their free upper edges as well as between the edges of the bottoms 3, the level differences $c$ are equal.

In the auxiliary space of the compartment VI, I provide a juice collector 6 in the shape of an inclined trough having as lateral sides the inner wall 4 and the frontal wall 1. From this trough the sugar juice is drained from the apparatus via pipe 7.

The supply of recycled sugar juices to the apparatus is performed at the lower part of the saturation space of compartment I by pipe 9 through the lateral wall 2. The pipe 10 supplies ahead of the suction of the pump VIII, fresh sugar juices; to the same wall 2 is connected near the upper saturation space of the compartment IV, the intake 7' for recycled juices, which are drained by pipe 8 and reach compartment I, by pump 11.

At the lower part of each compartment is located the carbonation gas distributor 12, supplied through the lateral wall 2', by pipes 13 through valves 14, which are automatically controlled from main pipe 15.

At its top side, the apparatus is closed by the lid 16, provided with the vent pipe 17, for used gas evacuation.

In the described apparatus, the juices processing takes place in the following manner: the fresh juice is continuously fed at a flow rate X by pipe 10, and by the recycled juices pipe 9, from compartment IV to compartment I at a flow rate 8 times higher, i.e. 8X. Here juices are treated with carbonation gas from distributor 12, at a rate controlled by valve 14, being partially saturated and brought to the pre-established alkalinity and pH. New quantities of calcium carbonate are formed in the juices, which contribute to the growing of the existing particles, simultaneously with the adsorption of nonsugars on them. The juices, supplied and treated here, fill the saturation space $S_s$ and continuously overflow the weir formed by the inner vertical wall 4, into auxiliary space $S_a$, where purification continues. The juices pass through opening $a$—while maintaining the hydraulic seal—in compartment II. The juices that fill each saturation space are further treated, as in compartment I, and so on, in each compartment, until their discharge from compartment VI into the collector 6 from which they are emptied from the apparatus by pipe 7 and conveyed as the first saturation juices to the next operation.

The juices circulation along the apparatus, from one compartment into the other, is secured by the successive juice level difference in their saturation spaces $S_s$.

The apparatus of FIGS. 4–6 also has its treating space composed of six adjoining compartments marked I to VI, respectively separated from each other by the front walls 1' and dividing walls 1, assembled to the common lateral walls 2, 2', with the bottoms 3 in steps. In each of the compartments II–VI there is an inner vertical wall 4, placed near the dividing wall 1, on the previous compartment side. Thus, each compartment is formed, up to the level of the inner vertical wall 4, with the saturation space $S_s$ and auxiliary space $S_a$, which are full of juice when in operation. The dividing wall 1 has, near its bottom and over its entire depth, a narrow opening $a$, through which juices pass into the next compartment.

At the junctions of the inner vertical walls 4 to the bottoms 3, are located their feet 5, that complete and close the auxiliary spaces and the juice passages.

The inner vertical walls 4 have the same height and between their free upper edges, as well as between their bottoms 3, the level differences are equal to $c$.

From compartment VI, the sugar juice passes via the vertical pipe 6, with a height corresponding to the inner vertical walls 4, into the collector 7, from which it drains from the apparatus.

The apparatus is supplied with recycled sugar juices in the compartment I at its saturation space $S_s$ by pipe 9. The pipe 10 supplies fresh sugar juices. To the lateral wall 2 is connected in compartment IV near the bottom, the intake 7' for recycled juices which are drained from the apparatus by the pipe 8 and the pump 11, reaching the compartment I via the pipe 9.

At the lower part of each compartment is placed the carbonation gas distributor 12, supplied at the lateral wall 2' by pipes 13 through the valves 14 automatically controlled from the main pipe 15.

At its upper part, the apparatus is closed by the lid 15 provided with a vent pipe 17 for evacuation of excess gas.

In the described apparatus, sugar juices are processed in the following manner: fresh sugar juice is supplied continuously by pipes 10 at a flow rate X and by the recycled-juice pipe 9 at a flow rate of, say, 8X (8 times higher) to compartment I.

Here the juices are treated in countercurrent with $CO_2$ from distributor 12 at a rate controlled by valve 14, being partially saturated to a pre-established alkalinity (pH), according to the indications given by the electrical conductivity or pH measuring instruments. Quantities of calcium carbonate are formed in the juices which contribute to the growth of the existing particles, and adsorb the nonsugars. The juices supplied and treated here fill the saturation space $S_s$ and, via the opening $a$ forming the hydraulic seal, also fill the auxiliary space $S_a$; the excess continuously overflows the inner vertical wall 4, existing in the compartment II, into the auxiliary space $S_a$, where the purification process continues. The juices that fill the saturation spaces are further treated in each compartment, until discharged from compartment VI by pipe 6 to the collector.

In this apparatus are, for example, processed limed fresh sugar juices supplied at an alkalinity of 2%, calculated as calcium oxide.

What is claimed is:

1. A continuously operating apparatus for the treatment of sugar juice with carbon dioxide, said apparatus comprising:

a series of upright processing compartments of rectangular horizontal cross section and substantially similar horizontal width, said compartments including at least two pairs of mutually adjacent compartments with the adjacent paired compartments being separated by partitions, said series of compartments being vertically staggered in cascade while being relatively deep and narrow;

means including a slot formed in each of said partitions close to the bottom of a preceding compartment, each of said slots opening into a succeeding compartment and communicating between the adjoining compartments, said slots extending substantially over the entire width of said compartments;

a vertical wall in at least one compartment of each pair of adjacent compartments disposed close to the corresponding partition and defining in said one of said compartments an auxiliary space communicating with the slot of the corresponding partition and of a horizontal thickness equal to a minor fraction of the overall horizontal thickness of said one of said compartments while terminating below the top of the wall of the partition of a preceding pair of compartments to form respective weirs between the compartments of each pair, said walls extending over substantially the full horizontal width of the apparatus and defining in each of the compartments containing such wall a saturation space of relatively large horizontal cross section and adapted to receive juice overflowing the weirs and passing in cascade through the successive compartments;

gas-distribution means at the bottom of the saturation spaces of at least some of said compartments for bubbling carbon dioxide through the juice passing in cascade through said compartments, said gas-distribution means extending substantially over the full width of said compartments;

means for introducing sugar juice to be purified to an upstream one of said compartments; and means for recovering at least partially purified juice from a downstream compartment.

2. An apparatus as defined in claim 1 wherein the sugar juice passes downwardly through the saturation spaces countercurrent to the passage of gas bubbles upwardly therethrough.

3. An apparatus as defined in claim 1 wherein said sugar juice passes upwardly through the saturation space of said compartments in the direction in which the carbon dioxide gas bubbles upwardly therethrough.

4. An apparatus as defined in claim 1, further comprising means for removing at least part of the juice traversing a downstream one of said compartments and recycling it to an upstream compartment.

5. An apparatus as defined in claim 1, further comprising means responsive to the alkalinity of the sugar juice traversing said compartments for controlling the degree of carbonation thereof in said compartments.

6. An apparatus as defined in claim 1 wherein said walls are all of the same height and the successive walls have their upper edges spaced below the upper edges of the preceding wall by a distance which is constant for all said walls.

References Cited

UNITED STATES PATENTS

| 1,709,783 | 4/1929 | Etheredge | 127—13 X |
| 2,377,634 | 6/1945 | Kidd | 127—52 X |

FOREIGN PATENTS

| 3,938 | 3/1918 | Netherlands. |
| 723,390 | 8/1942 | Germany. |
| 834,566 | 4/1938 | France. |
| 1,154,410 | 9/1963 | Germany. |

OTHER REFERENCES

"Middle Juice Carbonation . . . ," Loh et al., Sugar, March 1955, pp. 34–36.

"The Chemistry of the Carbonation . . . ," Honig, Sugar, April 1951, pp. 37–39.

MORRIS O. WOLK, Primary Examiner

D. G. CONLIN, Assistant Examiner

U.S. Cl. X.R.

127—14, 52; 261—123, 124